United States Patent [19]

Rodriguez, Jr. et al.

[11] Patent Number: 5,241,333
[45] Date of Patent: Aug. 31, 1993

[54] OVERHEAD PROJECTOR WITH PIVOTING LAMP CHANGER AND COLOR ADJUSTMENT

[75] Inventor: Ernesto M. Rodriguez, Jr., Vadim A. Konradi, both of Austin, Tex.

[73] Assignee: Minnesota Mining and Manufacturing Company, St. Paul, Minn.

[21] Appl. No.: 960,491

[22] Filed: Oct. 22, 1992

[51] Int. Cl.⁵ .............................................. G03B 21/20
[52] U.S. Cl. ......................................... 353/87; 353/85; 353/119; 353/62
[58] Field of Search ..................... 353/85, 87, DIG. 3, 353/119, 57, 60, 61, 94; 352/198, 202, 203; 362/13, 11

[56] References Cited
U.S. PATENT DOCUMENTS

| | | | |
|---|---|---|---|
| 3,314,330 | 4/1967 | Finke | 352/198 |
| 3,515,476 | 6/1970 | Field et al. | 353/87 |
| 3,529,146 | 9/1970 | Betlejewski et al. | 352/198 |
| 3,529,147 | 9/1970 | Badalich | 352/198 |
| 3,567,318 | 3/1971 | Webb | 353/85 |
| 4,061,911 | 12/1977 | Krosin | 353/85 |
| 4,338,006 | 7/1982 | Ozeki | 353/85 |
| 5,135,301 | 8/1992 | Dreyer, Jr. et al. | 353/DIG. 4 |

Primary Examiner—William A. Cuchlinski, Jr.
Assistant Examiner—William C. Dowling
Attorney, Agent, or Firm—Gary L. Griswold; Walter N. Kirn; David W. Anderson

[57] ABSTRACT

An overhead projector is provided with two lamps arranged in an angular relationship on a frame having a single pivot point to cause the lamp not in use to be out of the path of air flowing to the lamp in use within the projector. The pivot point may coincide with a lead screw which would permit axial movement of the lamps in addition to rotational movement to correct for undesirable color effects.

4 Claims, 3 Drawing Sheets

OVERHEAD PROJECTOR WITH PIVOTING LAMP CHANGER AND COLOR ADJUSTMENT

FIELD OF THE INVENTION

The present invention relates generally to overhead projectors and particularly overhead projectors of the transmissive type.

BACKGROUND OF THE INVENTION

Overhead projectors of the transmissive type include a base, an upright post extending from the base and a projection head supported by the post. The base includes a light source and optical element designed to direct light from the source through a transparent stage defining the upper surface of the base and to the projection head. A transparent film having translucent or opaque indicia may be placed on the stage and an image of the indicia projected onto a distant vertical surface by the projection head. A lamp failure during use of the projector would cause obvious disruption of use of the projector and must be guarded against. In the past, overhead projectors have been provided with a so-called lamp changer consisting of two lamps mounted on a carriage which may be slid to position one or the other of the lamps at a useful projection point. If one lamp were to fail, the other could simply be slid into position and use of the projector continued. This arrangement has worked well in the past, but with the introduction of more powerful lamps, problems have arisen. The lamps generate a considerable amount of heat, so it is necessary to provide the projector with a fan to direct a stream of cooling air over the lamp. Unfortunately the only convenient location for the fan is such that the airstream travels parallel to the direction of carriage movement. Thus the lamp not in use blocks the flow of air to the lamp which is being used.

SUMMARY OF THE INVENTION

The present invention has addressed and solved the problem of providing adequate cooling to the lamp in use by the production of a transmissive overhead projector comprising a base having a wall defining an enclosure, a cooling fan disposed adjacent the wall and adapted to move air through the wall, means for passing air disposed in the wall at a distant location from the fan to pass air generated by the cooling fan and thus permit an airstream to flow between the fan and the means for passing air, a light source disposed within the base and including at least two lamps and a pivotable frame within the base and having a pivot point and mounting the lamps each at an equal distance from the pivot point so that pivoting of the frame will position one of the lamps at a predetermined position within the airstream passing between the fan and the air passing means and the remainder of the lamps will be positioned substantially out of the airstream. The projector is also provided with a lead screw defining the pivot point of the frame which may be turned to move the lamp in use in the direction of its optic axis in order to color tune the light source.

BRIEF DESCRIPTION OF THE DRAWING

The present invention will be more fully described with respect to the accompanying drawings, wherein like numbers refer to like parts in the several views, and wherein.

DESCRIPTION OF THE PREFERRED EMBODIMENT

Figure 1:
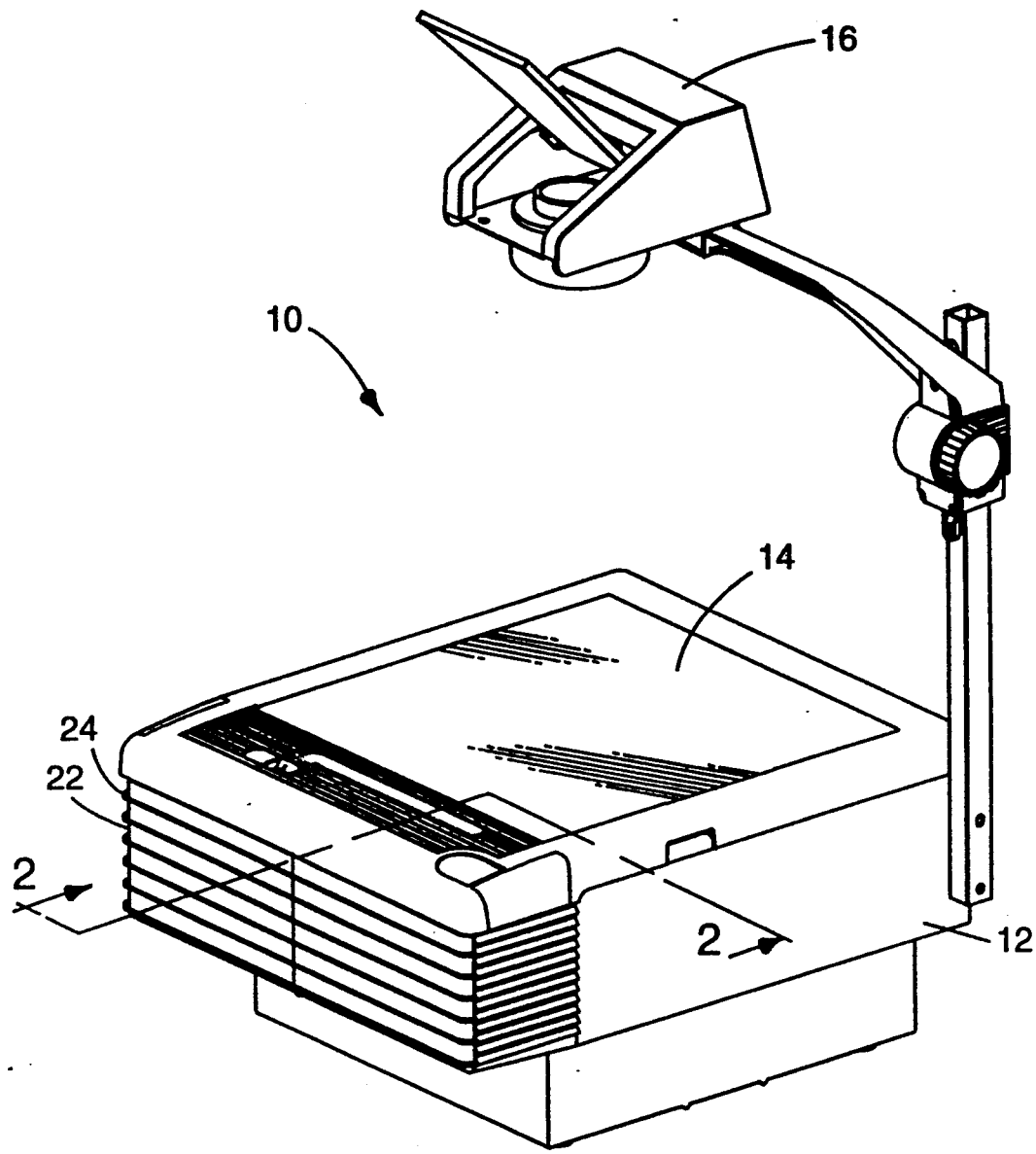
FIG. 1 is a perspective view of a transmissive type overhead projector incorporating the invention.

FIG. 1 illustrates an overhead projector generally indicated as 10. The projector 10 is of the so-called transmissive type in that a light source is located in the base 12 and directs light through a transparent stage 14 defining the upper surface of the base 12. A translucent or transparent film having indicia may be positioned on the stage 14 to intercept this light, and in this manner, an image of the indicia is directed upwardly to a projection head 16 supported above the projector base 12. This image is redirected by the projection head 16 to a distant vertical surface for viewing by an audience.

It may be imagined that a lamp failure during a presentation would be highly disruptive. To lessen this disruption, overhead projectors have been provided with a carriage carrying at least two lamps within the base 12 and operable by a lever accessible to the presenter to shift a failed lamp out of the projection position and insert another. In this manner, the presentation may proceed with only a minimal delay. Unfortunately, this lamp-changing arrangement has itself caused problems.

The primary cause of lamp failure is heat generated by the lamp itself. To combat this heat, overhead projectors are usually provided with cooling fans to produce an stream of cooling air to the lamp in use. In order that the height of the base 12 be kept as low a possible, the only practical location of the fan produces an airstream which flows parallel to the direction of movement of the lamp carriage. Thus the lamp which is not in use blocks the flow of air to the lamp which needs it.

Figure 2:
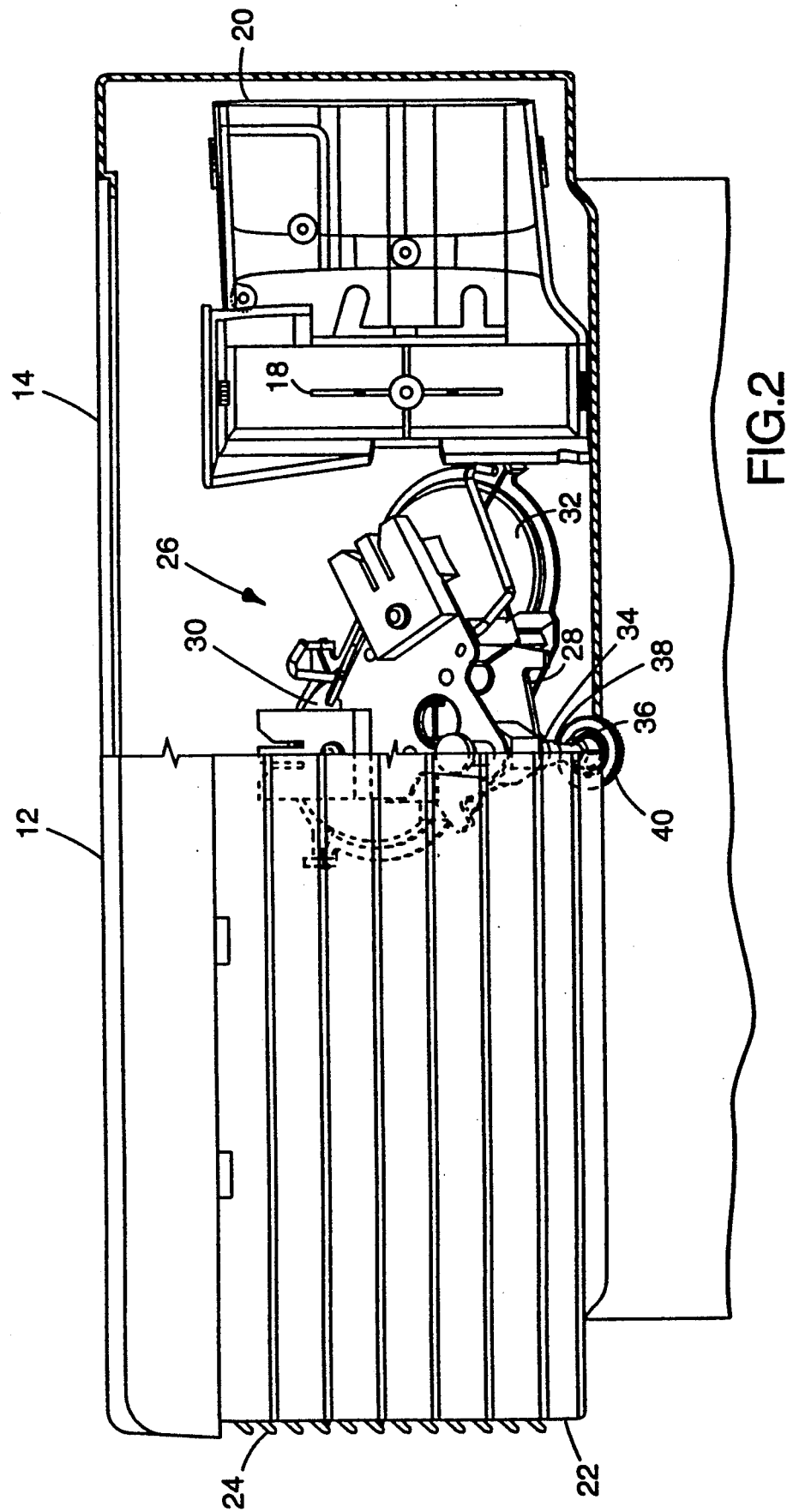
FIG. 2 is a cross-sectional view of a portion of the overhead projector of FIG. 1, taken generally along the line 2—2 of FIG. 1.

This problem has been addressed by the present invention as shown in FIG. 2. Illustrated is a fan 18 adjacent one wall 20 which produces the airstream. Located in the opposite wall 22 are louvers 24 which permit or enhance the flow of air from the fan 18, if the fan 18 blows air toward the louvers 24, or toward the fan 18 if it is operated to direct air in the opposite direction. It may well be imagined from the illustration of FIG. 2 that, if lamps where disposed in side-by-side arrangement between the fan 18 and the louvers 24, the flow of air to one lamp would be blocked by the other.

FIG. 2 illustrates how the present invention has overcome this problem. The lamp changer of the present invention is generally indicated as 26 and includes a frame 28 mounting two lamps 30 and 32. The frame has a pivot point 34 and supports the lamps 30 and 32 at equal distances from the pivot point 34. Thus the lamps 30 and 32 are angularly displaced from each other. The amount of angular displacement is kept as low as possible to not unduly increase the height of the base 12 and is determined by the physical dimensions of the lamps 30 and 32. If base 12 height were not a consideration, the lamps 30 and 32 could be separated by any angular displacement.

It will be seen that the angular displacement of the lamps 30 and 32, and the fact that the frame 28 pivots rather than translates, allows one lamp 32 to move out of the direct path of air to the lamp 30 in use which is positioned vertically within the base 12.

Figure 3:
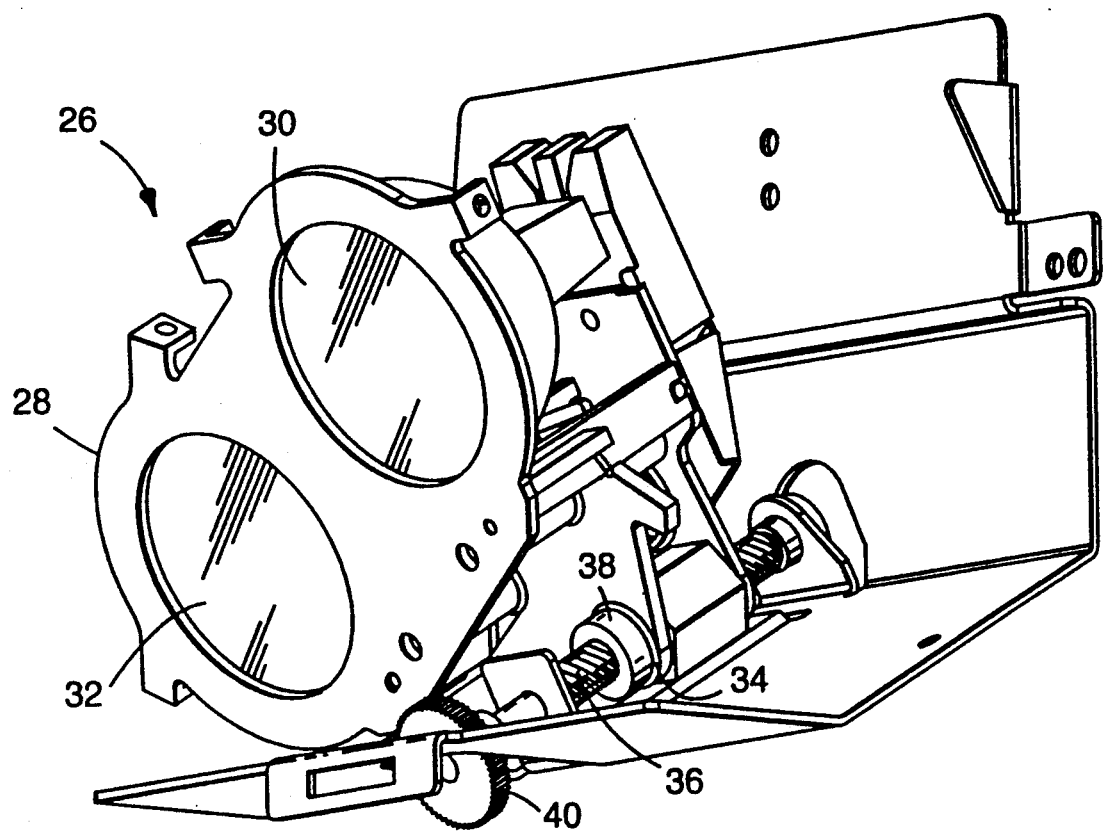
FIG. 3 is a perspective view of a lamp changer with color tuning adjustment which is the subject of the present invention.

FIG. 3 illustrates the lamp changer 26 of the invention in more detail and illustrates a second feature of the invention. Since the frame 28 pivots about a single pivot point 34, that pivot point 34 may be made to conveniently coincide with the centerline of a lead screw 36. The lead screw 36 is preferably a threaded shaft, and the frame 28 is mounted thereto by a threaded collar 38. Rotation of the lead screw 36 thus will cause movement of the frame 28 in the direction perpendicular to the plane of rotation of the frame 28. Rotation of the lead screw 36 may be accomplished by a knob 40 accessible through the bottom of the projector base 12.

Axial movement of the lamp 30 in use is desirable to correct for color effects in the projected image produced by improper distance of the lamp 30 from other optical elements within the projector base 12.

Thus the present invention has described a novel mounting arrangement for multiple lamps 30 and 32 within an overhead projector 10 which allows for greater cooling of the lamp 30 in use than previous projectors. The invention also permits convenient axial movement of the lamp 30 to correct for incorrect dimensional relationships between the lamp 30 and other optical elements of the projector 10.

Although the present invention has been described with respect to only a single embodiment, modifications will be apparent to those skilled in the art. For example, if the height of the projector base 12 were not an important factor, more than two lamps 30 and 32 could be arranged around the pivot point 34 of the frame 28 to provide additional insurance against lamp failure. The number of lamps is only limited by the number which will fit in a complete circle around the pivot point 34. Also, the pivot point 34 of the frame 28 could be simply attached to a smooth shaft along which the frame 28 could be slid rather than providing threaded engagement with the shaft as illustrated. Finally, if color tuning were not desired, the lead screw 36 could be eliminated and the frame 28 simply journalled to the frame 28.

I claim:

1. A transmissive overhead projector comprising:
   a base having a wall defining an enclosure;
   a cooling fan disposed adjacent said wall and adapted to move air through said wall;
   means for passing air disposed in said wall at a distant location from said fan to pass air generated by said cooling fan and thus permit an airstream to flow between said fan and said means for passing air;
   a light source disposed within said base and including at least two lamps; and
   a pivotable frame forming a portion of said light source and having a pivot point and mounting said lamps each at an equal distance from said pivot point so that pivoting of said frame will position one of said lamps at a predetermined position within said airstream passing between said fan and said air passing means and the remainder of said lamps will be positioned substantially out of said airstream.

2. A transmissive overhead projector according to claim 1 wherein said overhead projector includes a shaft and said frame is mounted on said shaft such that said pivot point coincides with the centerline of said shaft and wherein movement of said frame along said shaft will permit said frame to be moved in a direction perpendicular to the plane of said pivoting of said frame.

3. A transmissive overhead projector according to claim 2 wherein said shaft is a lead screw and said frame is threaded to said lead screw such that said pivot point coincides with the centerline of said lead screw and wherein rotation of said lead screw will cause movement of said frame along said lead screw to permit said frame to be moved in a direction perpendicular to the plane of said pivoting of said frame.

4. A transmissive overhead projector according to claim 3 wherein said lamps are two in number and are angularly separated from each other relative to said pivot point at an angle of substantially 60 degrees.

* * * * *